United States Patent [19]
Kunz et al.

[11] Patent Number: 5,273,317
[45] Date of Patent: Dec. 28, 1993

[54] OFF HIGHWAY TRUCK FRAME

[75] Inventors: James F. Kunz; Edward G. Orth, both of Peoria, Ill.

[73] Assignee: Komatsu Dresser Company, Lincolnshire, Ill.

[21] Appl. No.: 849,955

[22] Filed: Mar. 12, 1992

[51] Int. Cl.$^5$ .............................................. B62D 21/04
[52] U.S. Cl. .................................... 280/787; 280/795; 298/22 R
[58] Field of Search ...................... 296/184; 298/22 R; 280/786, 787, 800, 795, 796, 797; 180/292, 69.6, 312, 89.19, 89.12

[56] References Cited

U.S. PATENT DOCUMENTS

| | | | |
|---|---|---|---|
| 1,428,713 | 9/1922 | Schoenhard . | |
| 1,471,044 | 10/1923 | Lovejoy | 280/797 |
| 2,039,460 | 5/1936 | Smith | 280/787 |
| 2,525,988 | 10/1950 | Willson | 280/795 |
| 3,552,798 | 1/1971 | Cole et al. | 298/22 R |
| 3,712,404 | 1/1973 | Walquist . | |
| 3,720,279 | 3/1973 | Vincenty . | |
| 3,720,446 | 3/1973 | Kelly | 298/22 R |
| 3,786,889 | 1/1974 | Kelly . | |
| 3,977,489 | 8/1976 | Cole et al. | 180/89.1 |
| 4,231,589 | 11/1980 | Hodgkins et al. | 280/781 |
| 4,570,973 | 2/1986 | Ewers et al. | 280/800 |
| 4,746,145 | 5/1988 | Furuichi | 180/312 |

FOREIGN PATENT DOCUMENTS 3808314 8/1989 Fed. Rep. of Germany ...... 280/781
210145 9/1987 Japan ................................. 298/22 R Primary Examiner—Karin L. Tyson
Attorney, Agent, or Firm—Hubbard, Thurman, Tucker & Harris

[57] ABSTRACT

A truck frame (100) for use hauling heavy loads in a dump body (14) pivotally attached thereto utilizes a first beam (102) as a central spline for the truck (10). The first beam (102) is constructed by welding steel sheeting together around a plurality of support gussets (124). A pyramidal structure (102) connects this first beam (102) to a second beam (106). A pair of outriggers (110) extend from the second beam (106). The front suspension attaches the front wheels (16) of the truck (10) to the frame (100). The rear wheels (18) attach to the distal end of the first beam (102c) by the rear suspension (24). A cab support structure (120) extends across the proximal end of the first beam (102a). The monobeam construction allows for the use of two engines (30) mounted on either side of the first beam (102). If two engines are used, a second pair of outriggers (130) are utilized for support.

17 Claims, 5 Drawing Sheets

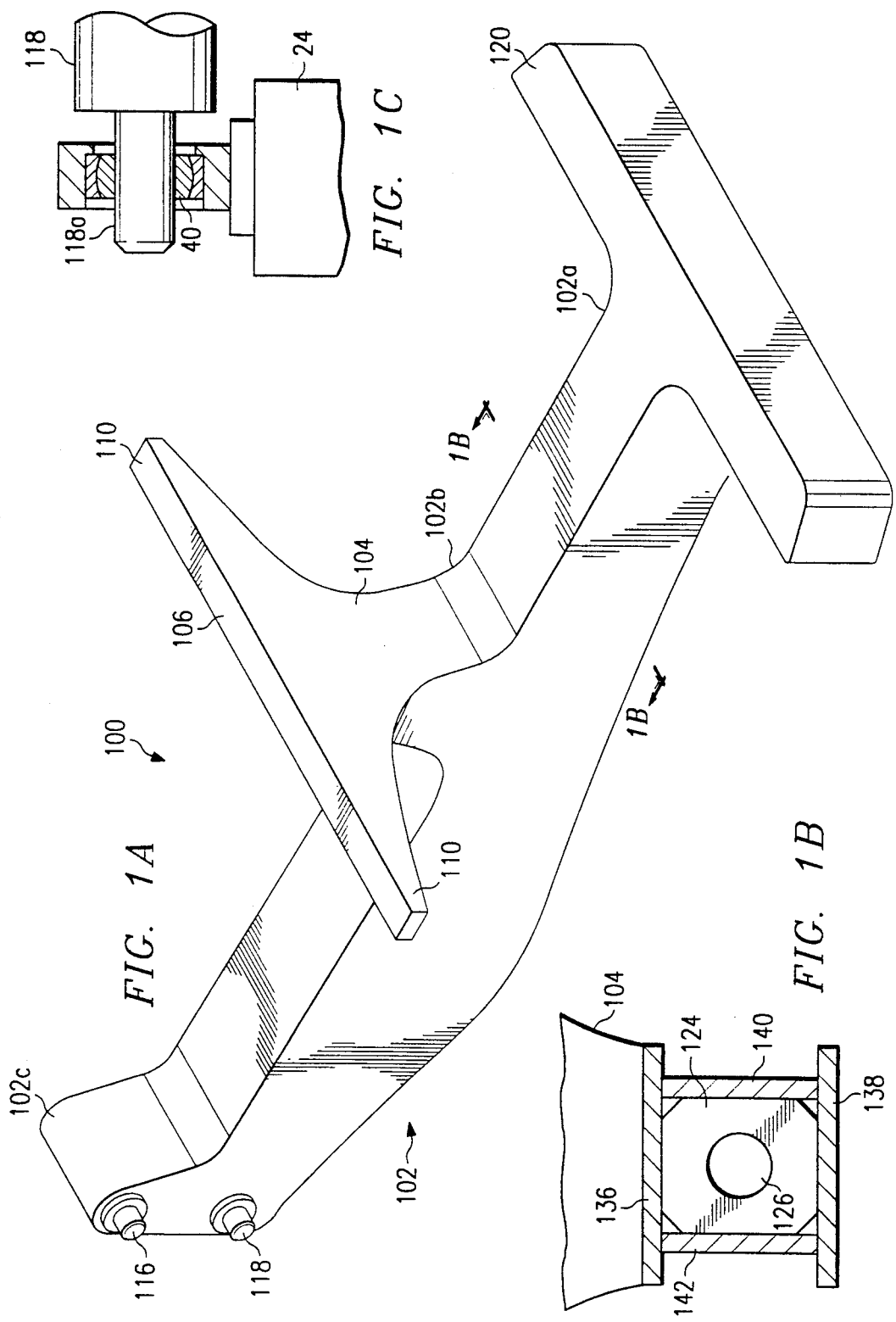

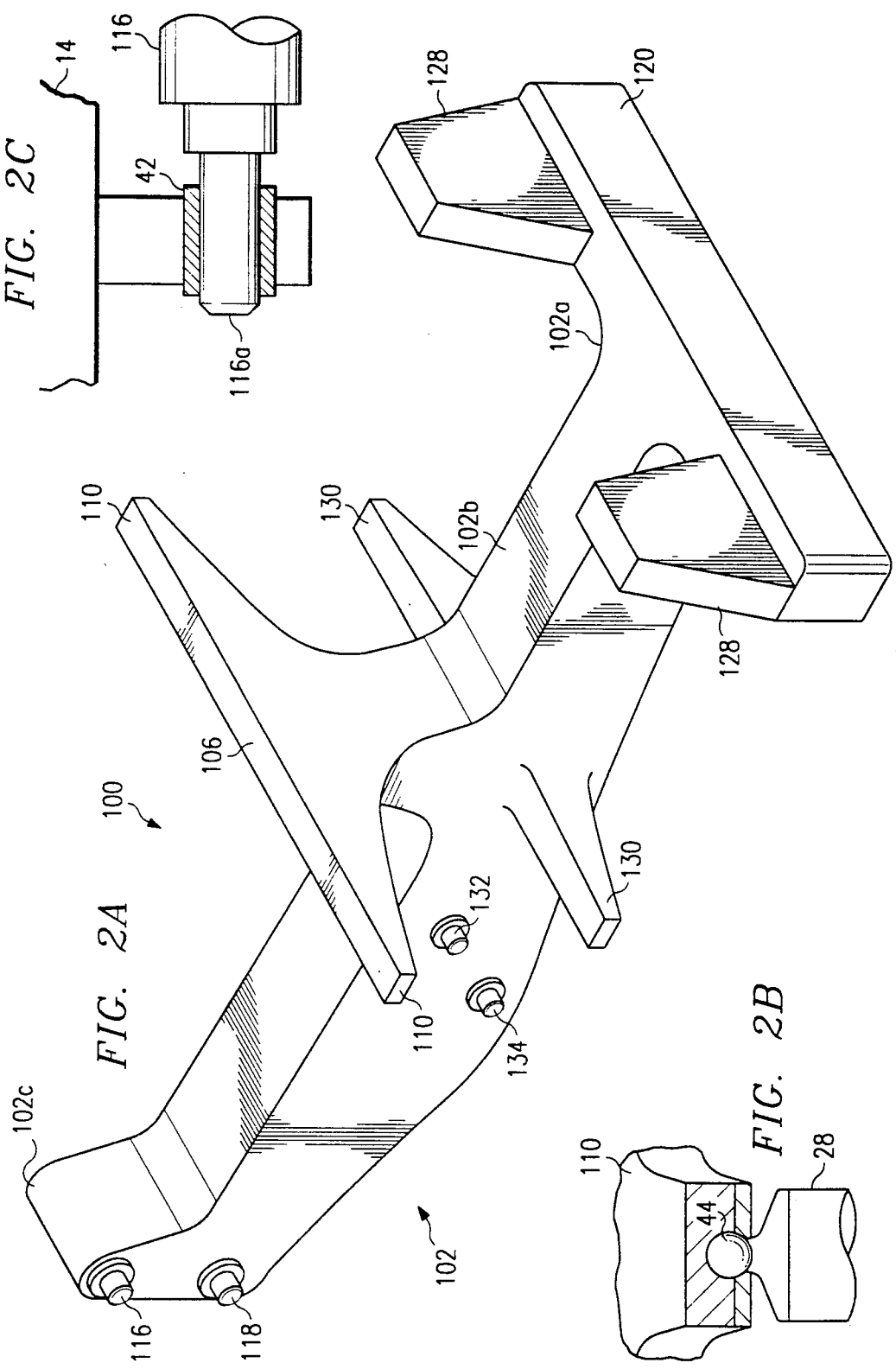

OFF HIGHWAY TRUCK FRAME

TECHNICAL FIELD OF THE INVENTION

The present invention relates to an off highway truck frame. More particularly, the off-highway truck frame utilizes a single, central beam which exhibits greater torsional stiffness per pound of frame weight than conventional frames.

BACKGROUND OF THE INVENTION

Truck frames must be especially rugged due to their utilitarian function. Off-highway trucks, which are used extensively for earth-moving operations, tend to require even more rigid frames to handle loads that can exceed thirty tons. The frames must handle both static and dynamic loads. These loads are typically a combination of bending, transverse and torsional loads. To provide transverse rigidity between the front wheels, prior frameworks have used a circular-shaped cross support, commonly referred to as a "horse collar". A horse collar extends in circumposing relationship about the engine. The horse collar carries the large moment forces caused by the cantilevered relation of the wheels to prevent torsional bending of the opposite main side rails of the framework. However, the presence of such horse collars makes the engine extremely difficult to service and essentially impossible to remove without first removing a portion of the horse collar to permit the necessary access to the engine.

A modified horse collar design is disclosed in U.S. Pat. No. 3,977,489 to Cole et al., entitled "Framework For A Wheeled Self-Propelled Truck," in which the framework includes a pair of longitudinally disposed, laterally spaced main side rails. A superstructure provides an upper, transverse bridgework interconnecting the side rails to add transverse rigidity in a manner which does not obstruct overhead accessibility to the engine. The superstructure also provides radial support for the upper ends of front suspension struts to minimize twisting of the main side rails by moment loads created by the wheels.

Another common truck frame is a "ladder type" frame which provides two longitudinal frame members connected by two transverse frame members. The ladder type frame provides torsional stability and is easily constructed. However, the generally rectangular shape of the frame diminishes the steering capability of the truck. An example of a modified ladder type frame is illustrated in U.S. Pat. No. 3,786,889 to Kelley, and entitled "Steerable Load Transporting Vehicle." The main frame members extend longitudinally of the vehicle and converge toward each other at an acute angle proceeding toward the forward end of the frame. This wedge shape allows the wheel assemblies to be steered through a greater angle. Still, either a ladder type frame or a frame with a horse collar involve a great deal of material cost and weight. Moreover, prior art frames, such as those described, are typically limited to use with a single engine.

Therefore, a need exists for an off-highway vehicle frame that is lighter, less expensive, and more efficient than conventional frames of similar function and capacity. The frame should be more efficient in terms of increased torsional stiffness per pound of frame weight. The frame should also connect the various necessary components comprising the vehicle with a minimum amount of joints and material. Additionally, the frame should be capable of, but not limited to, use with two separate diesel engines mounted side-by-side, as well as to the use of an A-frame and strut-type suspension arrangements.

SUMMARY OF THE INVENTION

The present invention relates to a structural frame for a large motorized vehicle, which comprises a single beam-like rail that serves as a central spline for the vehicle. The rail varies in cross-section along its length in order to allow for the transference of differing magnitudes of loads. The rail is hollow and may be constructed from welded metal panels. The size of the frame allows sufficient space for welding the internal joints between top and side plates. This allows for more efficient construction and improves the joint performance. In approximately the middle of the rail, a pyramid-shaped structure rises up from the top of the rail. The pyramid-shaped structure supports a beam which is generally perpendicular to and above the rail. The rail is intended to provide support for the front wheel suspension of the vehicle. The suspension for the rear wheels is attached to the frame through a cantilevered hinge or similar means which passes through a rearward section of the rail.

A large bucket or dump body capable of holding rock, dirt, or other excavated material, may be attached to the frame at a point adjacent to the rear end of the beam and is pivotably supported by a pin or axle about which the dump body can rotate in order to empty the dump body. A cantilevered beam is formed intricately with and perpendicular to the front of the rail. The cantilevered beam provides support for twin engines which may be mounted side by side of the rail. Further, the cantilevered beam could also support sheet metal for the front body or cab of the vehicle as well as heat exchangers to cool the engines.

The purpose of the invention is to provide a design for an off-highway vehicle frame that is lighter, less expensive, and more efficient than conventional "Ladder-Type" frames of similar function and capacity. The frame is more efficient in terms of increased torsional stiffness per pound of frame weight, and it connects the various necessary components comprising the vehicle with a minimum amount of joints and material. Additionally, the frame is capable of, but not limited to, use with two separate diesel engines mounted side-by-side. Using a single beam frame with twin engines allows for a narrower overall vehicle width than a conventional frame in a similar application might provide. Locating a single beam frame along the vehicle centerline increases the space available to the tire especially while turning. This factor also contributes to decreased vehicle width by reducing the amount of suspension offset required to properly position the wheel and tire. It is particularly well-suited to this purpose as well as to the use of an A-frame and strut-type suspension arrangements.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIGS. 1A, 1B, 1C provide a perspective view and two detail views of a preferred embodiment of the present truck frame;

FIGS. 2A, 2B, 2C provide a perspective view and two detail views of an alternate embodiment of the present truck frame;

DETAILED DESCRIPTION OF THE DRAWINGS

Figure 4:
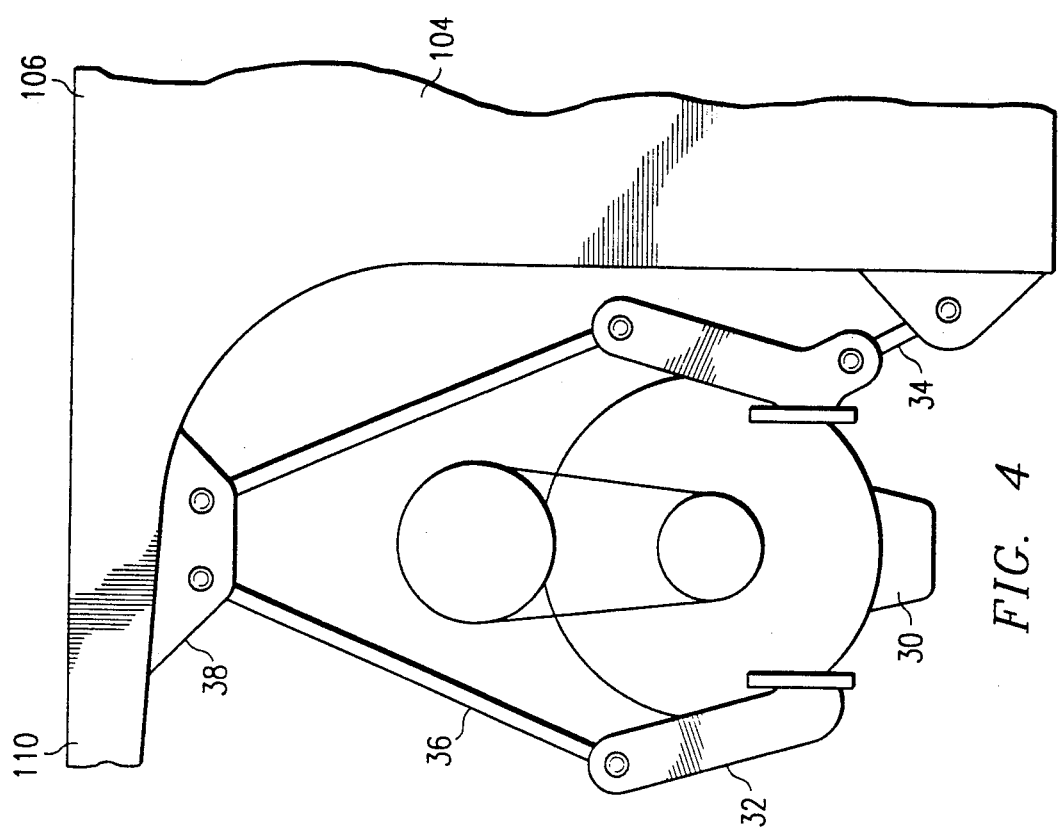
FIG. 4 is a front view of the present truck frame with an engine mounted thereto.

The present invention relates to an off-highway truck frame that overcomes many of the disadvantages found in the prior art. Referring to FIG. 1A, a truck frame 100 embodying the present invention is shown. This frame comprises a first beam 102, or monobeam, serving as the central spline of the vehicle. The beam 102 varies in cross-section along its length for transferring differing magnitudes of loads between the components. The first beam 102 has a proximal end 102a and a distal end 102c on either end of a central section 102b.

Rising from the top of the central portion 102b of first beam 102 is pyramidal-shaped structure 104 of construction similar to that of the beam. This structure supports a second beam 106. The pyramidal structure 104 provides a nearly continuous filament between the first and second beams 102, 106. The second beam 106 and pyramidal structure 104 create a "pylon". This T-shaped structure's purpose is to serve as a centrally located mount for the first outriggers 110 which connect to the front suspension. In doing so, this structure 110 is capable of transferring applied loads to the front wheels (not shown). These outriggers 110 are an extension of the second beam 106 and serve to locate and support the top of the front suspensions.

A cab support structure or third beam 120 is mounted transversely to the first beam 102 and serves several purposes. It is the front support for the sheet metal comprising the fenders, decks and the cab. The cab support structure 120 can also support the engine's heat exchangers as well as acting as the front engine mount. The structure 120 may also act as a bumper for protecting the rest of the vehicle from frontal impacts.

FIG. 1B illustrates the construction of the first beam 102 with sectional view 1B—1B. Two pair of opposed surfaces can be welded together around a plurality of support gussets 124. The side surfaces 140, 142 are inset from the upper and lower surfaces 136, 138. Increased strength is achieved by welding both the outer and inner seams at the intersection between the adjacent sides. Support gussets 124 are spaced along the length of the first beam 102. Each gusset 124 can have a central opening present to reduce weight. The inset of the side walls 140, 142 create a channel construction. The frame is typically made with steel or aluminum sheeting and steel or aluminum castings at critical joints to provide continuous load paths and simplify construction.

The rear suspensions 24 are attached to the frame through a cantilevered pin 118a or similar means as shown in FIG. 1C. A spherical bearing 40 is used to allow some relative movement between the frame 100 and the suspension 24. The rear suspension connection means 118 can be mounted on both sides of the first beam 102 or may be a single unit which passes through the width of the beam.

FIG. 2A illustrates an alternative embodiment of the truck frame 100. This embodiment is identical to that described in FIG. 1 but incorporates several additional features. Most notably, a second pair of outriggers 130 can be mounted on either side of the first beam 102. This second pair of outriggers 130 are mounted below the first pair of outriggers 110, and are utilized if twin engines are mounted on either side of the first beam 102. These cantilevered beams 130 would serve as rear supports for each engine working in combination with the front engine mounts 120. Hoist cylinder mounts 132 are located on the vertical side walls of the first beam 102 distally from the first and second outriggers 110, 130. The hoist cylinder mounts would use a pinned connection similar to that illustrated in FIG. 1C. Rear wheel assembly mounts 134 are typically located below and more distal from the hoist cylinder mounts 132.

Front sheet metal and heat exchanger support structures 128 can also be attached to the cab support beam 120. These additional support structures 128 can be in the form of sheet metal weldments extending upward from the cab support beam 120. In one embodiment, these support structures 128 may be tapered. Thus, the cab and deck structures can be supported by the both the earlier described pylon structure and this additional support structure 128.

A ball-and-socket type joint 44 or similar means, shown in FIG. 2B, complete the connection between the suspension 28 and the first outriggers 110. FIG. 2C illustrates the connection of the dump body 14 to the distal end 102c of the frame 100. The dump body is pivotally attached to dump body connection means 116 by a cantilevered pin 116a. The connection utilizes a cylindrical bushing 42 due to the axial movement of the dump body 14.

Figure 3:
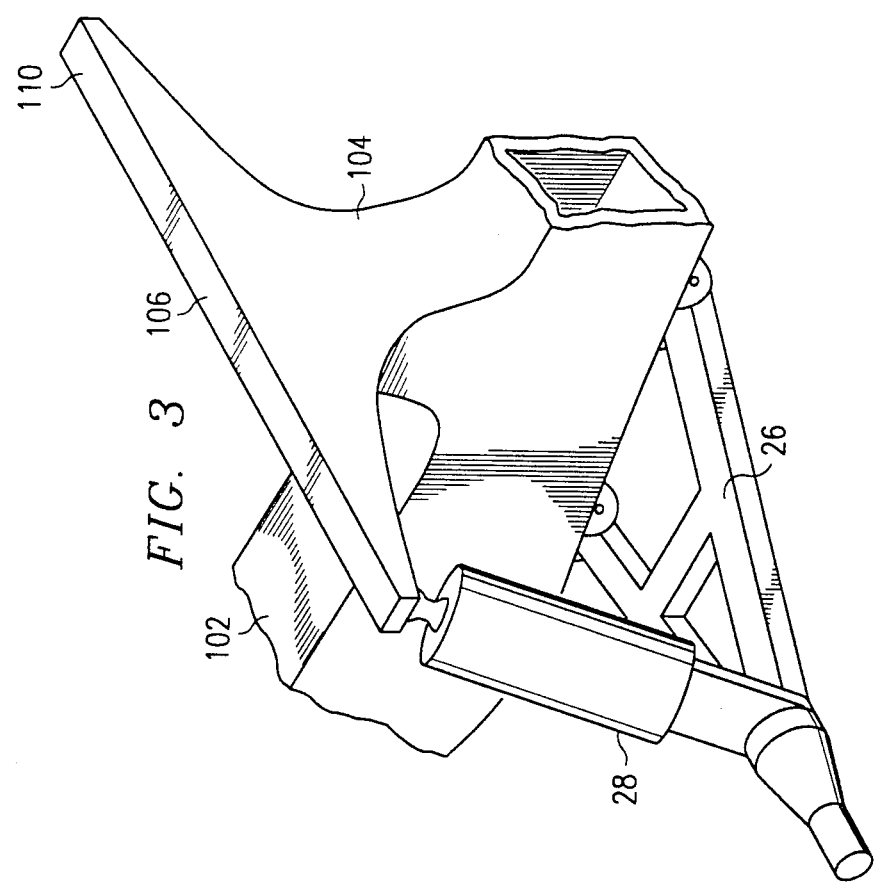
FIG. 3 is a perspective view illustrating the relationship between the present truck frame and a standard A-frame and strut.

FIG. 3 illustrates how a strut 28 and A-frame 26 front suspension is adaptable to this frame. Loading in the plane of the vehicle is transferred directly to the first beam 102 through the A-frame 26. Vertical loads are handled by the pylon through a strut which sees only axial loading. On a twin engine application, this suspension encompasses the engine module and adds little or no increase in vehicle width.

Numerous other attachments to the frame would be required but are of a secondary nature. These additional attachments could include fuel tank brackets, hose and wiring supports, and ladders. Even the major components such as the rear engine mounts could be arranged differently. For example, FIG. 4 shows an alternative rear engine mount 32 using metal rods 36 suspended from the pylon. These rods 36 are attached to both rear engine mounts 32 and are restrained in motion by the front engine mount and an anti-sway bar 34 as shown.

Figure 5:
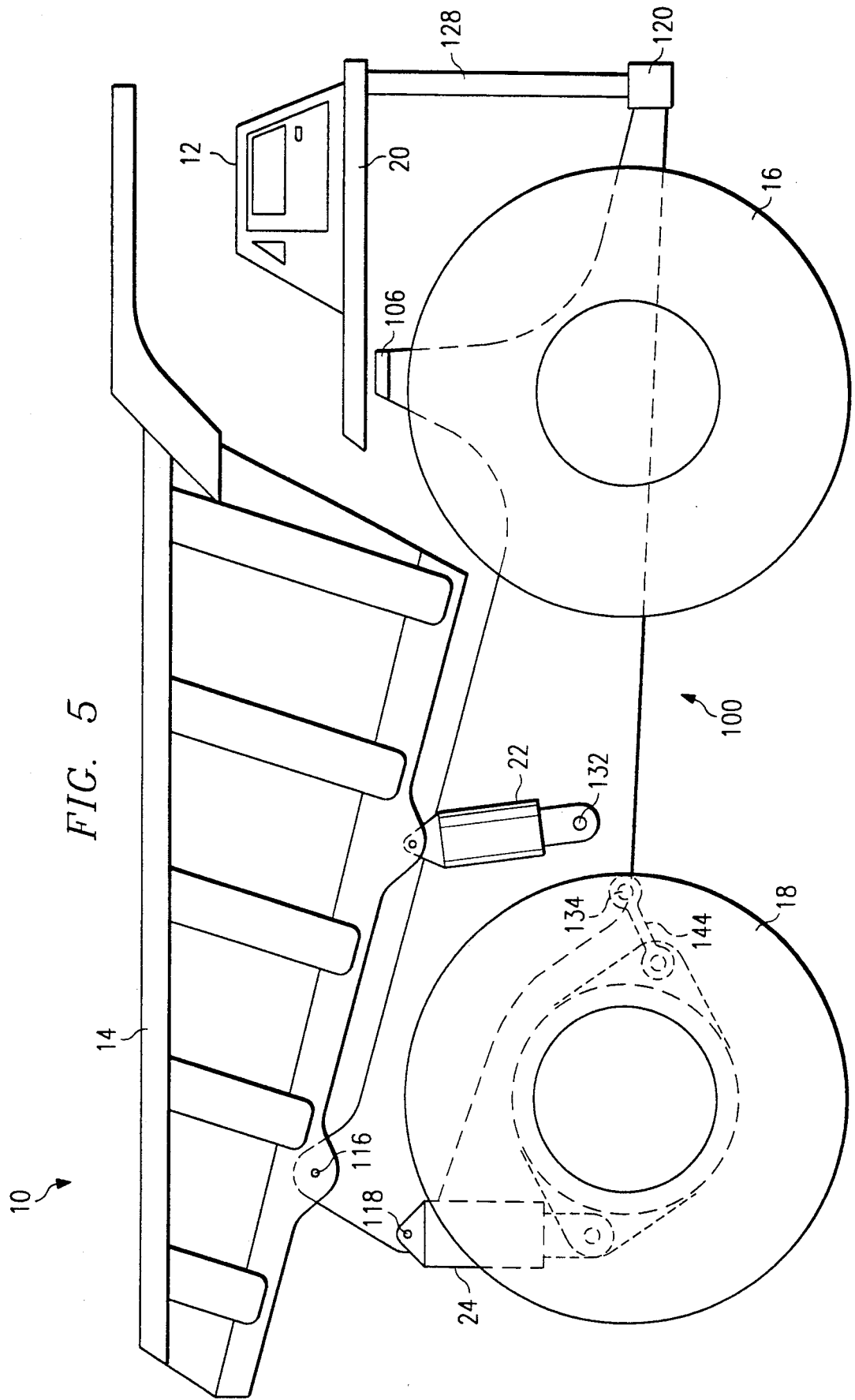
FIG. 5 is a side view illustrating the present truck frame with a cab and dump body attached thereto.

FIG. 5 illustrates a truck 10 utilizing the frame 100. The frame 100 supports a cab structure 12 from which a driver controls the truck. The cab structure is supported by the second beam 106 and the support structures 128. A dump body 14 is also pivotally mounted to the frame 100 by dump body connection means 116 at the distal end 102c of the first beam 102. A hoist cylinder 22 is attached between the hoist cylinder mounts 132 and a midpoint of the dump body 14. When the hoist cylinder 22 extends, the dump body 14 pivots about point 116, thus dumping the contents of dump body 14.

The front wheels 16 are attached to the frame as shown in FIG. 3, while the rear wheels 18 are attached to the frame by a rear suspension 24 and rear axle locating links 144. At least one pair of pivots 134 would be necessary for attaching the rear axle locating links 144. These links 144 would typically use a pinned connection similar to that shown in FIG. 1C to position one end of each link 144 while allowing the rear axle some freedom of movement. Additional joints such as this would be required to completely restrain the axle's movement depending upon the type of rear suspension arrangement chosen.

Figure 6:
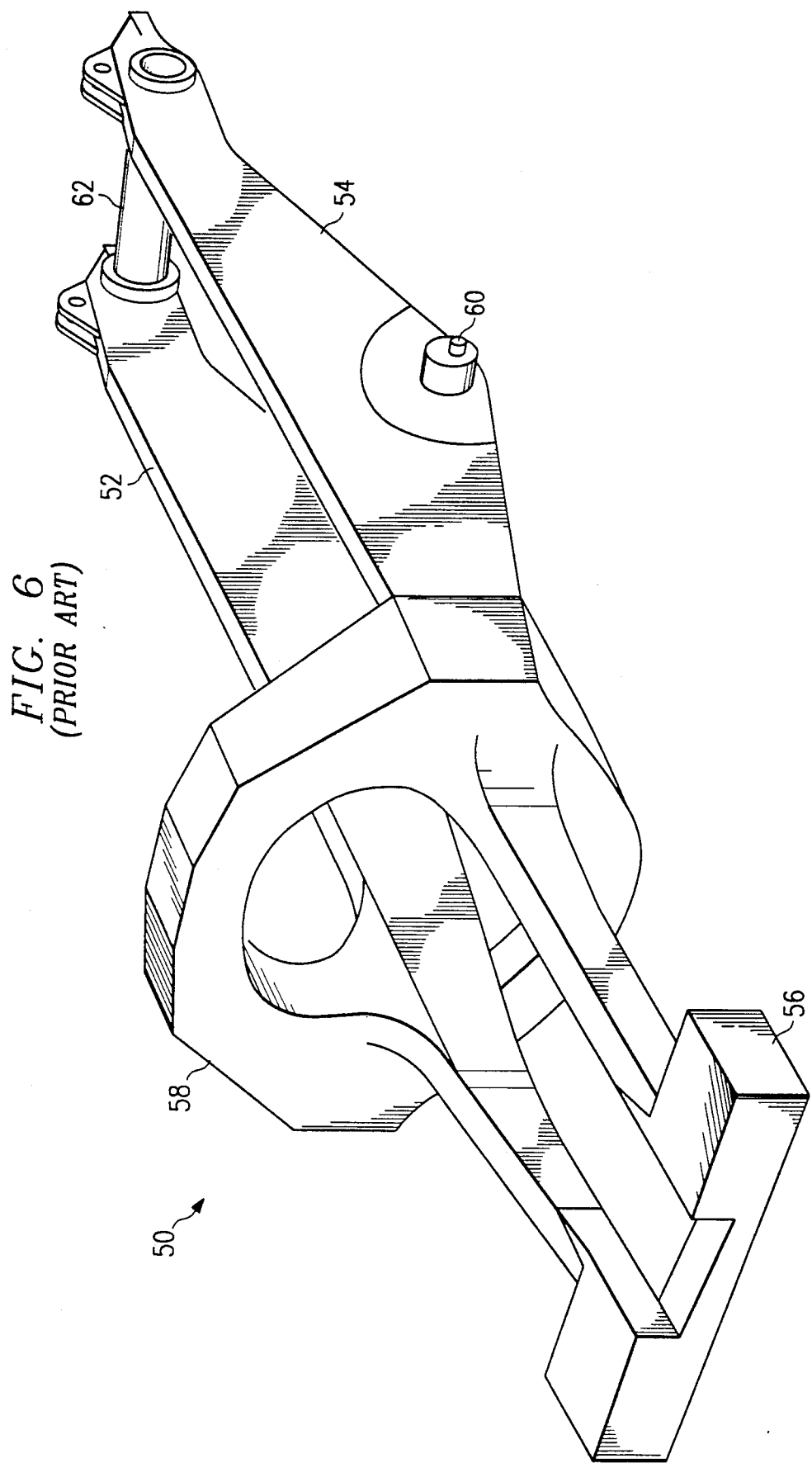
FIG. 6 illustrates a prior art truck frame utilizing a horse collar.

FIG. 6 illustrates a prior art truck frame 50 utilizing a horse collar 58. The prior art frame 50 is comprised of a first and second longitudinal beam 52, 54. These beams 52, 54 are separated by the dump body pivot surface 62 at their distal ends. The proximal ends of the beams 52, 54 are connected by a front support structure 56. The horse collar 58 provides transverse rigidity between the front wheels. The horse collar extends in circumposing relationship about the engine and carries the large moment forces caused by the cantilevered relation of the wheels, thus transferring loads between the opposite first and second beams of the framework.

In summary, the present truck frame comprises a single first beam with a transverse T-shaped pylon extending therefrom to form the central spline or backbone of a wheeled off-highway vehicle. The present frame is especially suitable for use with a twin engine configuration, strut and A-frame front suspension, and a multiple-link rear axle arrangement. Regardless of the suspension arrangement used, the frame's narrow width, light weight, simple construction and efficient use of material all improve the frame's performance compared to prior art frames.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit of the scope of the invention.

We claim:

1. A truck frame for use with at least one engine comprising:
   (a) a first beam with a distal end and a proximal end on either side of a central portion, said first beam comprising a hollow channel with a plurality of spaced support gussets welded therein;
   (b) a pyramidal structure extending upward from the central portion of the first beam;
   (c) a second beam attached to the pyramidal structure, said second beam being perpendicular to and removed from said first beam;
   (d) a first pair of opposed outriggers extending from either end of said second beam;
   (e) a third beam mounted transversely to the proximal end of said first beam;
   (f) a second pair of outriggers mounted on opposite sides of the central portion of the first beam; and
   (g) means to connect said first beam to suspension means.

2. A truck frame for use with at least one engine comprising:
   (a) an elongated monobeam structure comprising a first beam having proximal and distal ends and a central portion therebetween, the central portion having an elevated pylon extending outwardly therefrom to serve as a centrally located mount having transversely extending outrigger beam means for connecting a front suspension;
   (b) said proximal end having a cab support structure for supporting a cab; and
   (c) said distal end having connection means for attachment of supporting wheels.

3. The truck frame of claim 2 wherein said pylon further comprises central support means extending upward from the central portion of the first beam.

4. The truck frame of claim 3 wherein said central support means comprise:
   (a) a pyramidal structure extending upward from the central portion of the first beam; and
   (b) a second beam attached to said pyramidal support, said second beam being perpendicular to and spaced from said first beam and supporting said outrigger beam means.

5. The truck frame of claim 2 wherein said first beam comprises a generally rectangular structure with a top and a bottom plate and side plates welded around a plurality of support gussets.

6. The truck frame of claim 5 wherein said side plates are inset from said top and bottom plates.

7. The truck frame of claim 5 wherein each of said plurality of support gussets comprises a plate with a centrally located hole therethrough.

8. The truck frame of claim 2 wherein said cab support structure comprises a third beam mounted transversely across the proximal end of the first beam.

9. The truck frame of claim 8 wherein said cab support structure further comprises additional support structures extending upward from said third beam, creating a stable platform in conjunction with said central support structure.

10. A truck frame for use with at least one engine comprising:
    (a) a first beam with a distal end and a proximal end on either side of a central portion;
    (b) a pyramidal structure extending upward from the central portion of the first beam;
    (c) a second beam attached to the pyramidal structure, said second beam being perpendicular to and removed from said first beam;
    (d) a first pair of opposed outriggers extending from either end of said second beam; and
    (e) a third beam mounted transversely to the proximal end of said first beam.

11. The truck frame of claim 10 further comprising:
    (a) a second pair of outriggers mounted on opposite sides of the central portion of the first beam.

12. The truck frame of claim 10 further comprising:
    (a) means to connect said first beam to suspension means.

13. The truck frame of claim 10 further comprising:
    (a) at least one hoist cylinder mount attached to the central portion of said first beam.

14. The truck frame of claim 10 wherein said first beam comprises:
    (a) a plurality of spaced support gussets welded between a top and bottom plates; and
    (b) a pair of vertical plates welded to said support gussets and inset from said top and bottom plates.

15. The truck frame of claim 10 wherein said pyramidal structure comprises a hollow channel structure.

16. The truck frame of claim 10 wherein said second beam comprises a hollow channel structure.

17. The truck frame of claim 2 wherein the monobeam varies in cross-section along its length for transferring different magnitudes of loads between the components.

* * * * *